US007676495B2

(12) United States Patent
Qian

(10) Patent No.: US 7,676,495 B2
(45) Date of Patent: Mar. 9, 2010

(54) ADVANCED STREAMING FORMAT TABLE OF CONTENTS OBJECT

(75) Inventor: Richard Junqiang Qian, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 755 days.

(21) Appl. No.: 11/107,201

(22) Filed: Apr. 14, 2005

(65) Prior Publication Data
US 2006/0235880 A1    Oct. 19, 2006

(51) Int. Cl.
*G06F 17/30*    (2006.01)
(52) U.S. Cl. .................................. 707/104.1
(58) Field of Classification Search ............. 707/1, 707/6, 101, 104.1, 205; 379/88.1; 725/22; 715/200, 201, 205, 209, 273, 716; 348/423.1, 348/462
See application file for complete search history.

(56) References Cited

U.S. PATENT DOCUMENTS

| | | | | |
|---|---|---|---|---|
| 6,714,909 | B1 * | 3/2004 | Gibbon et al. | 704/246 |
| 7,003,719 | B1 * | 2/2006 | Rosenoff et al. | 715/205 |
| 7,137,062 | B2 * | 11/2006 | Kaufman et al. | 715/200 |
| 2002/0120939 | A1 * | 8/2002 | Wall et al. | 725/87 |
| 2004/0045030 | A1 * | 3/2004 | Reynolds et al. | 725/110 |
| 2004/0133927 | A1 * | 7/2004 | Sternberg et al. | 725/136 |

OTHER PUBLICATIONS

U.S. Appl. No. 08/813,151, filed Mar. 7, 1997, Chadd B. Knowlton, Craig M. Dowell, Mark D. VanAntwerp, Steven P. Levi.
U.S. Appl. No. 09/510,565, filed Feb. 22, 2000, Chadd B. Knowlton, Craig M. Dowell, Mark D. VanAntwerp, Steven P. Levi.
U.S. Appl. No. 09/510,023, filed Feb. 22, 2000, Chadd B. Knowlton, Craig M. Dowell, Mark D. VanAntwerp, Steven P. Levi.
U.S. Appl. No. 10/376,428, filed Feb. 28, 2003, Chadd B. Knowlton, Craig M. Dowell, Mark D. VanAntwerp, Steven P. Levi.
U.S. Appl. No. 10/975,287, filed Oct. 28, 2004, Chadd B. Knowlton, Craig M. Dowell, Mark D. VanAntwerp, Steven P. Levi.
U.S. Appl. No. 10/975,597, filed Oct. 28, 2004, Chadd B. Knowlton, Craig M. Dowell, Mark D. VanAntwerp, Steven P. Levi.
U.S. Appl. No. 10/206,253, filed Jul. 25, 2002, Jai Srinivasan, Matthijs A. Gates, Philippe Ferriere.
U.S. Appl. No. 10/235,587, filed Sep. 4, 2002, Brian D. Crites, Clifford P. Strom, Cory R. West, Daniel A. Adent, Pratul Dublish.
U.S. Appl. No. 10/836,141, filed Apr. 30, 2004, Anders E. Klemets.

\* cited by examiner

*Primary Examiner*—Diane Mizrahi

(57) ABSTRACT

A computer memory product having stored thereon a digital media file, the memory product comprising a computer readable memory, and a data file including at least two digital data portions; a header object including a table of contents (TOC) object containing data regarding the data file; and a second data object following the first header object containing data representing digital media wherein the TOC object is disposed between the first header object and the second data object.

20 Claims, 9 Drawing Sheets

| Field Name | Field Type | Size (bits) |
|---|---|---|
| Object ID 402 | GUID | 128 |
| Object Size 404 | QWORD | 64 |
| Table of Contents 406 | | varies |

TOC Object 202

FIG. 5

|  | Field Name | Field Type | Size (bits) |
|---|---|---|---|
| 602 | ID | GUID | 128 |
| 604 | Stream # | WORD | 16 |
| 606 | Type | GUID | 128 |
| 608 | Language ID Index | WORD | 16 |
| 610 | Description Size | WORD | 16 |
| 612 | Description | WCHAR | varies |
| 614 | # of Entry Levels | WORD | 16 |
| 616 | Context Size | DWORD | 32 |
| 618 | Context | BYTE | varies |
| 620 | Entry Lists |  | varies |

Table of Contents
406

FIG. 6

| Field Name | Field Type | Size (bits) |
|---|---|---|
| # of Entries 702 | DWORD | 32 |
| Entries 704 | | varies |

Entry Lists
620

| | Field Name | Field Type | Size (bits) |
|---|---|---|---|
| 802 | Entry Title Size | WORD | 16 |
| 804 | Entry Title | WCHAR | varies |
| 806 | Start Time | QWORD | 64 |
| 808 | End Time | QWORD | 64 |
| 810 | Start Packet Offset | QWORD | 64 |
| 812 | End Packet Offset | QWORD | 64 |
| 814 | Representative Frame Time | QWORD | 64 |
| 816 | # of Sub-Entries | DWORD | 32 |
| 818 | Sub-Entry Indices | See below | varies |
| 820 | Description Data Size | DWORD | 32 |
| 822 | Description Data Type | GUID | 128 |
| 824 | Description Data | BYTE | varies |

Entries
704

ADVANCED STREAMING FORMAT TABLE OF CONTENTS OBJECT

DESCRIPTION OF THE DRAWINGS

The present description will be better understood from the following detailed description read in light of the accompanying drawings, wherein:

FIG. 3 is a block diagram showing a second example of a TOC Object inserted as a new extended header object to form an ASF file with a.

FIG. 5 is a table illustrating an example of data fields that may be used in an ASF TOC.

FIG. 6 is a table illustrating an example of the sub data fields that may be contained in an ASF table of contents field.

FIG. 7 is a table illustrating an example of the representation of the structure of the entry lists sub data fields that may be contained in an ASF table of contents field.

FIG. 8 is a table illustrating an example of possible contents of the entries sub field.

Like reference numerals are used to designate like parts in the accompanying drawings.

DETAILED DESCRIPTION

Figure 1:
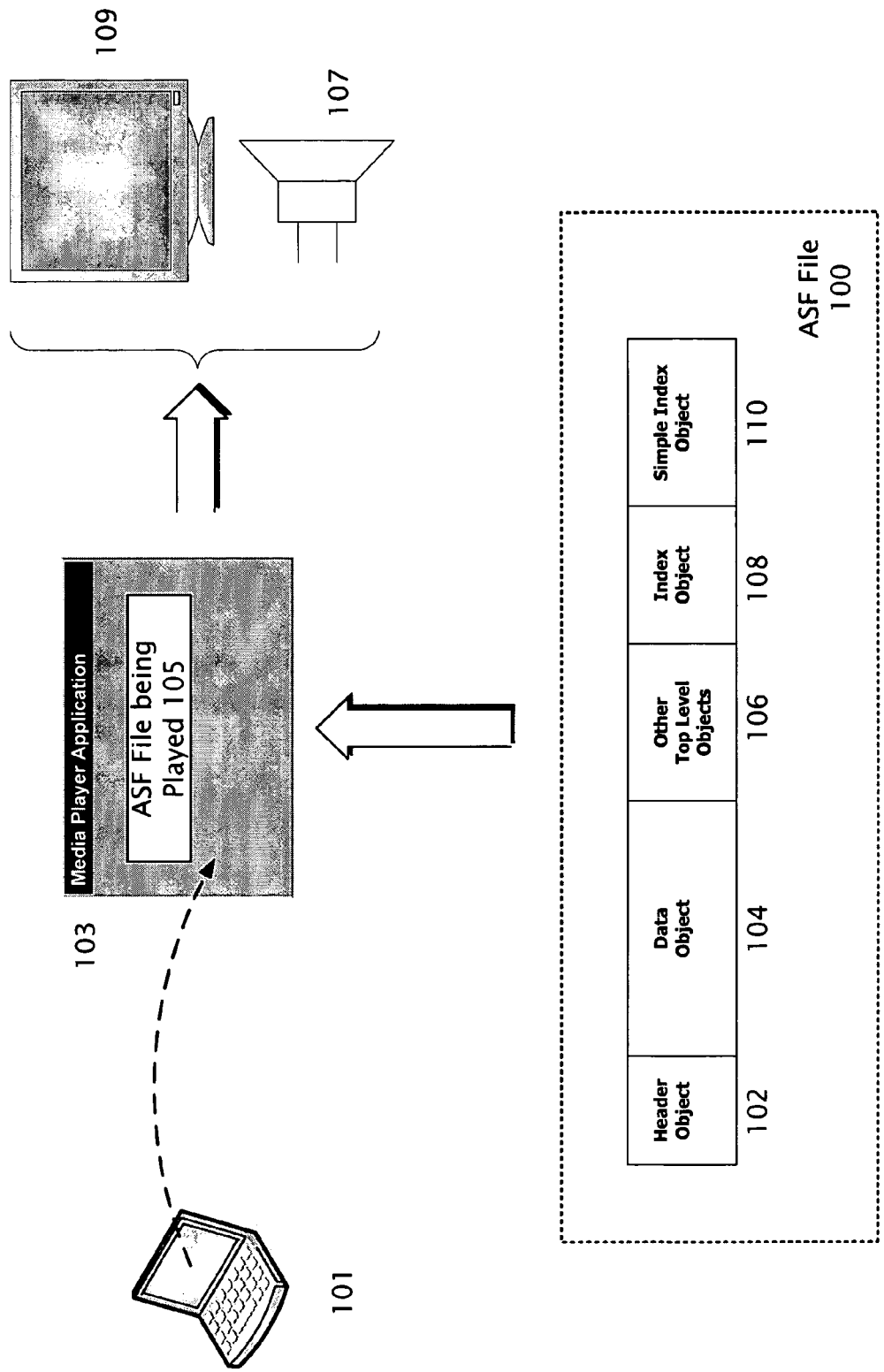
FIG. 1 Illustrates a conventional Advanced Streaming Format ("ASF") data file structure and its use.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in an ASF media file system, the system described is provided as an example and not a limitation. As those skilled in the art will appreciate, the present examples are suitable for application in a variety of different types of media file systems, including AVI and the like.

Most books contain a table of contents which gives the reader a hierarchical overview of the book contents and helps the reader to navigate through the pages quickly. Many books may also have a semantic index table to allow reverse lookup of the page numbers which are related to certain pre-selected keywords.

In contrast, most existing multimedia files such as WMV files do not have such index information. To find an interesting scene in a WMV file, the user would typically have to manually browse through the entire file. Such task is often tedious and time consuming especially for large files. Therefore, the examples described below seek to add advanced indexing functionality to multimedia files.

There are several unique aspects of the ASF specification that are addressed with the ASF Table of Contents ("TOC") object. The ASF specification may require any new top level objects to be inserted between the Data Object and the Index Object(s). A typical user defined index object, or objects, would be appended at the end of an ASF file. However appending an object to the end of a file may not work with all parsers or on all PCs or other multimedia devices. Next, in a conventional user defined index object hierarchical indices are typically not supported; and finally per-entry metadata typically allowed in a user defined object typically has the same fixed size. These typical limitations tend to be addressed by the new TOC Object.

The TOC object is typically comprehensive in that it may enable a hierarchical TOC and semantic indices in ASF files for a broad class of digital media applications for audio applications, video applications and the like. The ASF files including a TOC object are typically compatible with, and should work on, all devices capable of processing an ASF media file. The ASF file having a TOC object may allow new metadata of arbitrary type and size to be added without modification of the current design. The ASF file having a TOC object may provide search capability that may enable content-based indexing and retrieval for ASF files. And the ASF file having a TOC object may provide interoperability by creating and sharing the same indexing capability in different media applications, and on different platforms.

The examples introduce a table of contents structure to enable hierarchical table of contents and semantic indices in ASF files. The structure is typically simple but extensible. It typically allows fast read and write operations, and typically supports arbitrary levels of hierarchy to ensure maximum flexibility. Each entry in the structure can also contain any type of metadata to allow future extension and support a wide range of applications.

FIG. 1 Illustrates a conventional Advanced Streaming Format ("ASF") data file structure and its use. A conventional ASF media file 100 may be stored on a computer 101, and played 105 by, a conventional media player application 103 or the like. Those skilled in the art will realize that an AVI media file or its equivalent may be substituted for the ASF media file 100. Current ASF media files 100 typically do not provide a table of contents structure that is sufficient. Media players 103 typically reside on a processor based device such as the computer 101 shown. Those skilled in the art will realize that media players may be utilized by other devices such as consumer electronics devices and the like. Typically the ASF file is loaded by an application 103, and subsequently processed (or played) by the application 103, to produce an output such as the video output 109 and, sound output 107 shown here. ASF files 100 can convey a variety of information such as music, video and the like. Media players may include audio players, video players, editing programs, digital photo albums, and the like. The possible outputs 107, may include audio video and the like.

A typical ASF file may include a header object 102, a data object 104, and one or more index objects 108 110. In the ASF file structure space is provided for other top level objects 106. An ASF header object 102 typically includes a set of tables that may include information on the entire file, including the size of the file, if the file is packetized, how large the packets are, if there is audio stream, the number of streams present in the file, and the like. An ASF data object 104 may include the data or media content.

The ASF index 110 is typically a set of markers that may be coupled to the various points in the data object 104. This typically allows the media player application to seek those marked points quickly. The following paragraphs describe examples of ASF files that have an added TOC object. An ASF file may be provided with one or more TOCs at various locations within the file structure.

Figure 2:
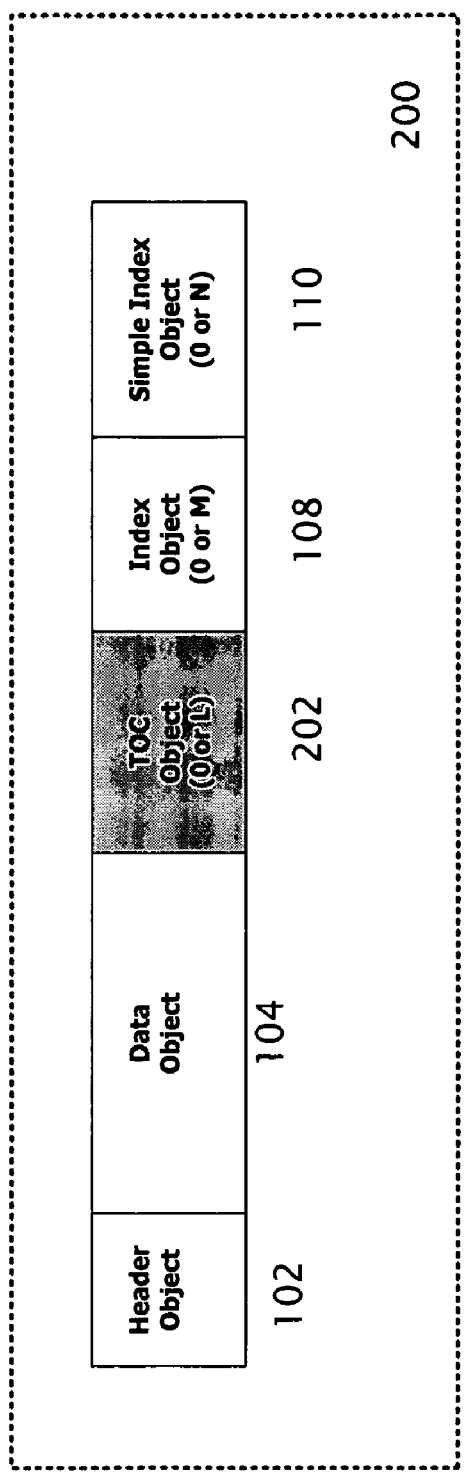
FIG. 2 is a block diagram showing a first example of a table of contents ("TOC") Object inserted as a new top-level object to form an ASF file with a TOC.

FIG. 2 is a block diagram showing a first example of a table of contents ("TOC") object 202 inserted as a new top level object to form an ASF file with a TOC 200. In this example the TOC object 202 has been disposed between the data object 104, and the index object 108 as a high level data object. The header object 102, and the index object are as previously described and conventionally constructed. This TOC object location may be useful in video editing applications where the TOC is created after the media is recorded or processed. For example it may be unproductive to place the TOC at the front of the ASF file because the size and content are not known until the recording or editing are completed. If insufficient space were reserved when keeping the TOC up front a time and storage space expensive data move operation would typically be needed to make room for the final TOC. By putting the TOC at the end the TOC is simply appended to the ASF media file when processing is completed.

The TOC object 202 may allow increased functionality with media player applications by allowing search and indexing to be incorporated into the application's designs to utilize the information contained in the TOC object, without appreciably increasing the compressed media file's size. The TOC object may be uncompressed, and contains all of the information it needs to produce a table of contents.

The TOC is typically an ASF object which can be placed either between the Data Object 104 and the Index Object(s) 108, 110, as a new top level object or inside the Header Extension Object in an ASF file as a new extended header object. There can also be multiple instances of the TOC Object in an ASF file, e.g., one that mimics the table of contents typically found in the front of a book; one that mimics the Indices typically found in the end of a book; one per media stream, etc.

The TOC Object and CDD Descriptors typically comply with the ASF formatting guidelines. In particular, typically all structures have one byte packing, typically all references to Unicode strings imply a null-terminated string, and objects and structures are typically stored in little-endian order.

The basic data types utilized may include BYTE, WCHAR, WORD, DWORD, QWORD, and GUID. BYTE data type typically has a size of 8 bits and is not signed. WCHAR data type typically has a size of 16 bits and is not signed. WORD data type typically has a size of 16 bits and is not signed. DWORD data type typically has a size of 32 bits and is not signed. QWORD data type typically has a size of 64 bits and is not signed. GUID data type typically has a size of 128 bits and is not signed.

The Table of Contents (TOC) Object 202 is a new ASF object for storing advanced index information and associated metadata in ASF files. Examples of such index information include table of contents, semantic indices and story boards. Examples of the associated metadata include entry-based textual description, cover arts, thumbnails, audiovisual DSP properties, cross references and the like.

Most existing multimedia files do not contain an index. To find an interesting scene, typically the user will browse the file manually. The examples provided describe a solution for adding advanced index functionality to multimedia files. It typically extends the User-Defined-Index (UDI) Object design of the Advanced Streaming Format (ASF) specification to create a new indexing object which complies with ASF formatting guidelines. This new indexing object is called a table of contents object ("TOC Object").

The TOC Object is an extensible structure which allows a hierarchical table-of-contents, semantic indices and associated metadata to be stored in ASF files. Unlike a standard UDI object, this new TOC Object may be inserted into the ASF file as either a top-level or extended header object. The result is a format which is compatible with most devices and interoperable such that the indexing capability may be shared with many different media applications and platforms.

Figure 3:
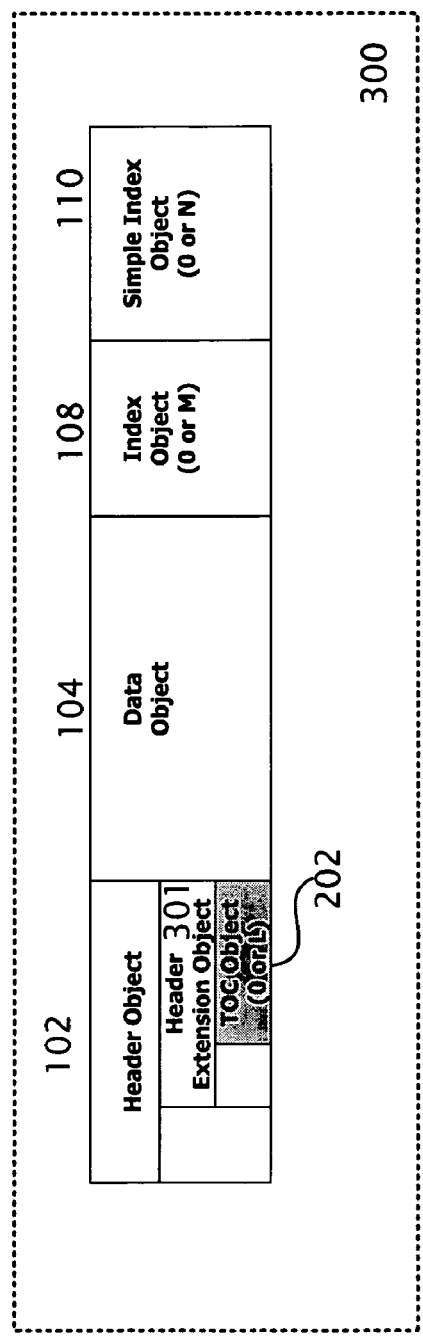

FIG. 3 is a block diagram showing a second example of a TOC Object 202 inserted as a new extended header object 301 to form an ASF file with a TOC. In the example shown the TOC object 202 is disposed as an extension of the ASF header 102. This configuration may be useful where the entire file is not streamed before playback. By putting the TOC object at the beginning of the file the TOC may be displayed before the entire file is downloaded. With this method the user may download the TOC and then pick which portions of the media file to download without having to download the entire file.

Figure 4:
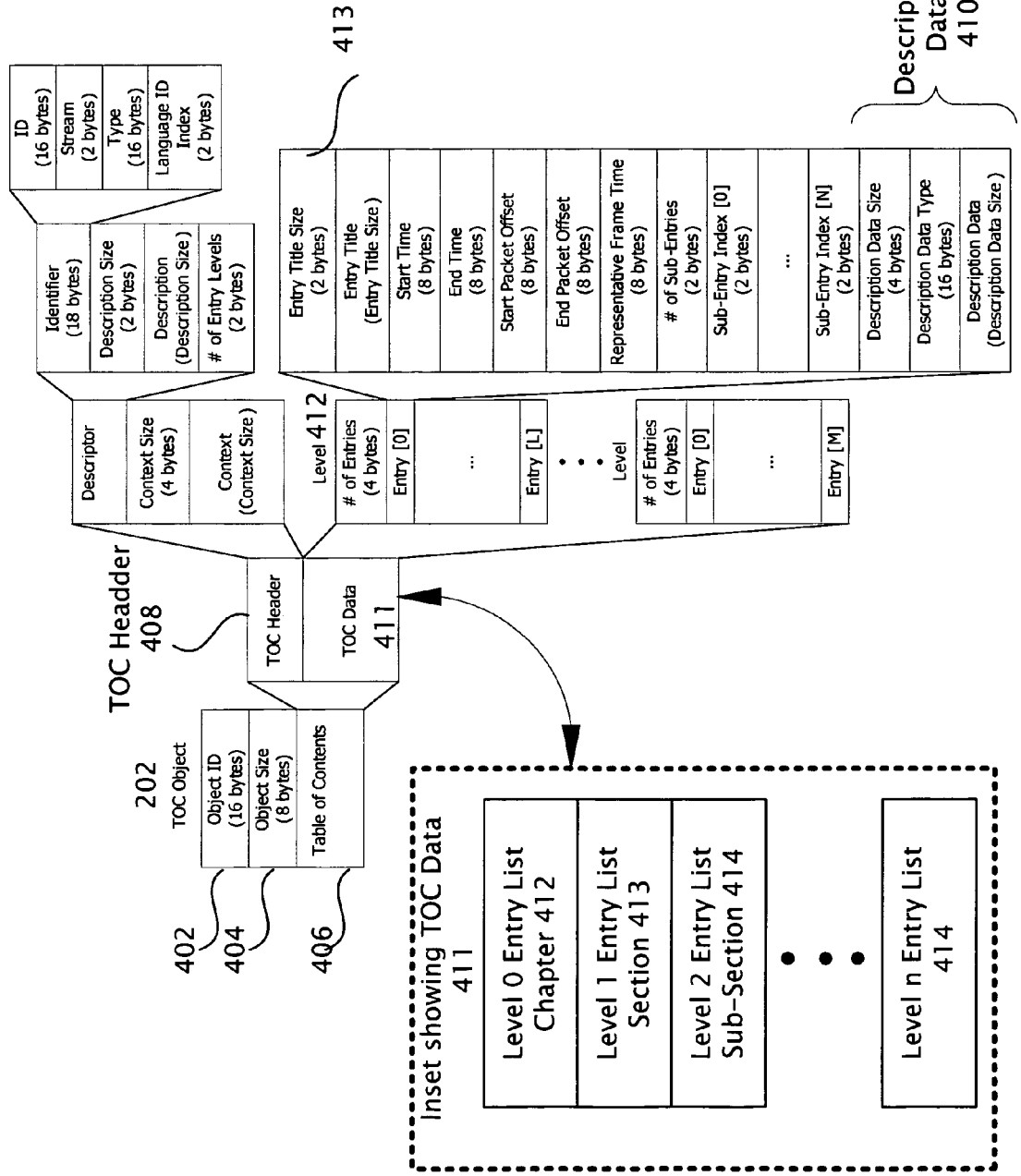
FIG. 4 is a block diagram showing the layout of the TOC Object that tends to provide effective browsing of media content.

FIG. 4 is a block diagram showing the layout 400 of the TOC Object 202 that tends to provide effective browsing of media content. In the TOC object an TOC Header 408 is first provided that identifies the TOC object 202 and describes its overall properties.

The TOC header 408 is followed by a number of hierarchal entry lists contained in the TOC Data section 411. The TOC Data section 411 contains the TOC information that starts with an Entry List "level 0" 412 shown in the inset. Each Entry List is basically a group of entries that could correspond to the chapters of a video. As shown in the inset each level in an Entry List corresponding to chapters 412 may in turn have its own Entry List that could correspond to sections within a chapter 413. Accordingly each section may have its own Entry List that could form subsections of the section 414. This nested structure may be repeated without limit, and is shown to the right of TOC Headder 408 and TOC data 411. Physically each Entry List makes up a level in the TOC Object, as shown in the inset. The portion of the diagram to the right of TOC header 408, and TOC Data 411 illustrates the heirarchal relationship amoung the Level Entry Lists. For example the level 0 entry list of chapters may be the first entry list to follow the header. The level 1 entry list that lists the chapters may follow the entry level 0 list. The entry level 2 list that lists the sections may follow the level 1 entry list. The entry level list 3 that lists the sub sections may follow the entry level 2 list, and so on. Each entry may contain a description data field 410 that may be used to store metadata.

FIG. 5 is a table illustrating an example of data fields 402, 404, 406 that may be used in an ASF TOC 202. The object ID field 402 specifies the GUID for the table of contents object. The value of this field shall be set to 35003B7B-A104-4c33-A9EE-E2A240431F9B. The object size field 404 specifies the size, in bytes, of the Table of Contents Object. Valid values for the example shown are at least 70 bytes. The final field shown is the example ASF table of contents field 406. The ASF table of contents field 406 may contain a number of sub fields, or entry lists as previously described.

FIG. 6 is a table illustrating an example of the sub data fields that may be contained in an ASF Table of Contents field 406. In the Table of Contents 406 the data fields included in the header include 602, 604, 606, 608, 610, 612, 614, 616, 618. TOC data 411 is included in the entry lists 620.

The ID 602 sub field may specify a unique identifier for the Table of Contents 406. The stream number 604 sub field typically specifies the media stream number related to the table of contents. The Type 606 sub field typically specifies the type of the table of contents. It may be one of a number of the pre-defined GUIDs, or any other user-defined GUID. Examples of predefined GUIDs include ASF_TOC_Type_P-laylist (ACC8DAA6-9D06-42d6-8704-2B2CA8E1FD9A), ASF_TOC_Type_Editlist (2F133F06-0701-49f9-AD38-602F00A7882D), ASF_TOC_Type_User_Bookmarks (7A0D993C-C1B0-473b-A048-2AODE74E93A5), ASF_TOC_Type_DSP_Metadata (1AEDA271-281D-43ac-8735-8911D408FBCD), and the like. The Language ID index 608 sub field typically specifies the language, if any, which this table of contents uses or assumes. The Description Size 610 sub field typically specifies the size, in bytes, of the description 612 sub field. The Description 612 sub field typically contains a textual description of the Table of Contents. The Number of Entry Levels 614 sub field typically specifies the number of levels of the entry hierarchy. The Context Size 616 sub field typically specifies the size, in bytes, of the Context 618 sub field. The Context 618 sub field may contain any additional description data for this table of contents. Its size is typically determined by the Context size sub field 616. The Entry Lists sub field 620 typically consists of X lists of Entries where X equals the Number of Entry Levels 614.

FIG. 7 is a table illustrating an example of the representation of the structure of the Entry Lists 620 sub data fields that may be contained in an ASF Table of Contents field 506. The Number of Entries 702 sub field typically specifies the number of entries existing in this list. The Entries 704 sub field includes a number of possible fields.

FIG. 8 is a table illustrating an example of possible contents of the Entries sub field 704. The Entries 704 sub field typically consists of Y Entries where Y is equal to the Number of Entries 702. The Entry Title Size 802 field typically specifies the size, in bytes, of the Entry Title field. The Entry Title 804 field typically specifies the title for this Entry. Its size is determined by the Entry Title Size. The Start Time 806 field typically specifies the start presentation time for this entry, in 100-nanosecond units. The End Time 808 field typically specifies the end presentation time for this entry, in 100-nanosecond units. The time is set to 0 if it is not specified. The Start Packet Offset 810 field typically specifies the byte offset from the start of the first Data Packet in the ASF file to the start of the first Data Packet of this Entry. Note that for video streams that contain both key frames and non-key frames, this field will correspond to the closest key frame prior to the time interval. The End Packet Offset 812 typically specifies the byte offset from the start of the first Data Packet in the ASF file to the start of the last Data Packet of this Entry. Set to 0 if not specified. The Representative Frame Time 814 typically specifies the presentation time of a representative frame for this Entry, in 100-nanosecond units. The Number of Sub-Entries 816 typically specifies the number of sub-entries (i.e., children) under this Entry. Set to 0 if this entry has no sub-entries. The Sub-Entry Indices 818 typically consists of Z Sub-Entry Indices where Z is equal to the number of Sub-Entries. Each Sub-Entry Index is a WORD and contains the position of the corresponding child Entry in the next level Entry List. The Description Data Size 820 typically specifies the size, in bytes, of the Description Data. Set to 0 if this Entry has no additional description data. The Description Data Type 822 typically specifies the type of the Description Data. When Description Data Size is 0, this field will not exist.

The Description Data 824 entry typically contains any additional description data about this Entry. Its size is determined by the Description Data Size. The Description Data must belong to a predefined Description Data Type. A Description Data Type may be defined by anyone at anytime as long as the authoring application and the targeted client applications share the type definition and all know how to parse the data. The description data field 824 typically allows scalability and extensibility of the TOC object 202. Additional descriptive data that may be disposed here includes .jpg, .wav, .html, data, and the like. Examples of this additional data might include thumbnail pictures, sound clips and the like. The TOC may be added to at a later time as well. For example if a user repeatedly opens a media file to a specific chapter the application may make note of this fact and place a marker in the Description Data Field 824, so that the application can open the file to that particular location each time. A bookmark may also be placed in this location to open a file to where the user previously left off viewing the file.

The application processing the TOC object typically determines how the Description Data Field 824 is consumed. For example an application may let a user choose to view the data in this field, or the application may simply ignore the data in this field. For example, a TOC Object for a media player may simply display a text list of available songs when it is used on a cellular telephone with limited graphics, and the same application when ran on a PC may allow full display and access to the description data 824 field's information.

The exemplary TOC Object previously described was designed with compatibility in mind and follows the ASF design guidelines. As previously described, TOC Object can be either A) a top-level object placed between the Data Object and the Index Object(s) or B) an extended header object inside the Header Extension Object. It typically works with all parsers on many devices which properly implement the ASF specification. In practice, however, there do exist parsers which do not follow the ASF specification entirely. Some of their limitations may be hardware-related, e.g., limited memory size, etc. There are some specific considerations when implementing the TOC Objects that are described in the following alternative examples.

In a first alternative example a device accepts only a fixed header object. Some devices can only handle ASF files with the Header Object of a fixed size, i.e., no header extensions. In this case, the TOC Object should be placed after the Data Object. A properly implemented parser should ignore the TOC Object if it does not know how to handle it.

In a second alternative example a streaming application may require a small header object. Streaming applications may require the TOC Object to be included in the Header Object so that the TOC information will be available at the client side before the content starts. On the other hand, the Header Object needs to be small to avoid long delay. In this case, the application may choose to include the TOC Object in the Header Extension Object. It may also choose to not include any additional description data. In other words, the TOC Object will only contain the entry lists which include the entry titles and timestamps.

Applications of the ASF TOC are provided in the following examples. Those skilled in the art will realize that other examples in addition to the ones described are possible.

Application 1: Playback a WMV file in a media player application. In this application, the player may display the EntryTitle-Time pairs obtained from the TOC Object in its playlist. The entries may be hierarchically grouped, e.g., as chapters, scenes, and/or sub-shots. When the user clicks on one of the entries, the player will directly jump to the beginning of that segment according to the timestamp (or packet offset) stored in the TOC Object. The player may also choose to display thumbnails for each entry which may be stored as the associated metadata.

Application 2: Authoring a WMV file in a video editing application program. A video editing application may offer the user the ability to create chapters, choose names for the chapters, insert personal "bookmarks", grouping favorite scenes, etc. The chapter/bookmark/group names and their corresponding timestamps may then be stored into the TOC Object in the ASF file. The video editing application may also choose to store other additional description data, e.g., certain audiovisual DSP properties, to facilitate easy editing, fast browsing and content-based search.

Application 3: Streaming a WMV file from a video on demand ("VOD") server. A VOD server may use the TOC Object to provide its viewers the ability to see the overview of a movie or show via chapter lists, scene lists, story boards, etc. The TOC Object may be either parsed at the server side or streamed and parsed at the client side. The viewer may click on any particular chapter or scene which will then trigger the streaming of the actual content. The TOC Object may help make the VOD contents behave very much like the viewer's local DVD contents. In fact, because the TOC Object can store any type of metadata to facilitate visualization, search and pop-up info, it could make the VOD viewing experience even richer than the current DVD viewing experience.

Figure 9:
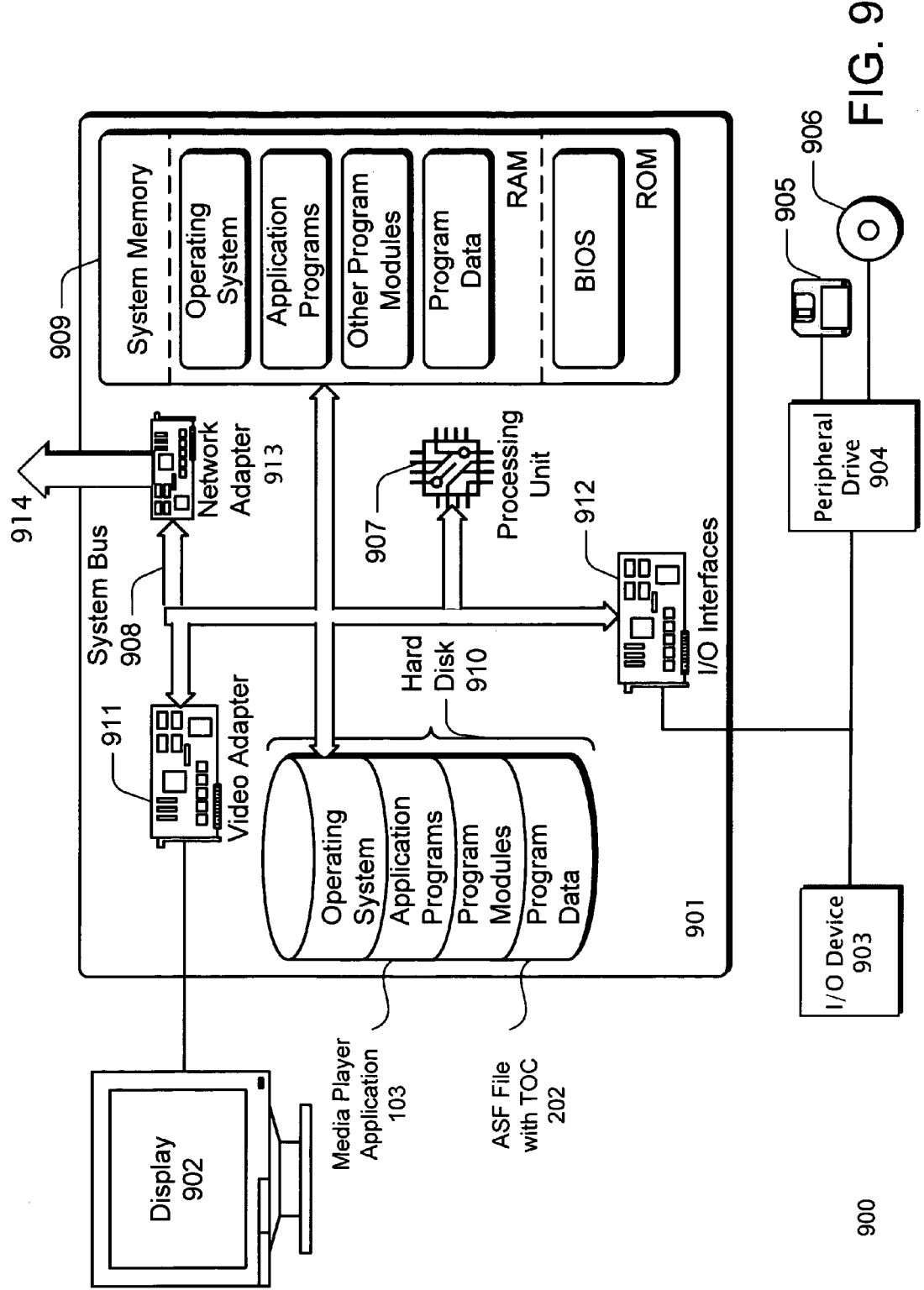
FIG. 9 illustrates an exemplary computing environment in which the systems and methods described in this application, may be implemented.

FIG. 9 illustrates an exemplary computing environment 900 in which the systems and methods described in this application, may be implemented. Exemplary computing environment 900 is only one example of a computing system and is not intended to limit the examples described in this application to this particular computing environment.

The computing environment 900 can be implemented with numerous other general purpose or special purpose computing system configurations. Examples of well known computing systems, may include, but are not limited to, personal computers, hand-held or laptop devices, microprocessor-based systems, multiprocessor systems, set top boxes, programmable consumer electronics, gaming consoles, Consumer electronics, cellular telephones, PDAs, and the like.

The computer 900 includes a general-purpose computing system in the form of a computing device 901. The components of computing device 901 can include one or more processors (including CPUs, GPUs, microprocessors and the like) 907, a system memory 909, and a system bus 908 that couples the various system components. Processor 907 processes various computer executable instructions to control the operation of computing device 901 and to communicate with other electronic and computing devices (not shown). The system bus 908 represents any number of several types of bus structures, including a memory bus or memory controller, a peripheral bus, an accelerated graphics port, and a processor or local bus using any of a variety of bus architectures.

The system memory 909 includes computer-readable media in the form of volatile memory, such as random access memory (RAM), and/or non-volatile memory, such as read only memory (ROM). A basic input/output system (BIOS) is stored in ROM. RAM typically contains data and/or program modules that are immediately accessible to and/or presently operated on by one or more of the processors 907.

Mass storage devices 904 may be coupled to the computing device 901 or incorporated into the computing device by coupling to the buss. Such mass storage devices 904 may include a magnetic disk drive which reads from and writes to a removable, non volatile magnetic disk (e.g., a "floppy disk") 905, or an optical disk drive that reads from and/or writes to a removable, non-volatile optical disk such as a CD ROM or the like 906. Computer readable media 905, 906 typically embody computer readable instructions, data structures, program modules and the like supplied on floppy disks, CDs, portable memory sticks and the like.

Any number of program modules can be stored on the hard disk 910, Mass storage device 904, ROM and/or RAM 909, including by way of example, an operating system, one or more application programs including a media player application 103, other program modules, and program data such as an ASF file with a TOC Object 202. Each of such operating system, application programs, other program modules and program data (or some combination thereof) may include an embodiment of the systems and methods described herein.

A display device 902 can be connected to the system bus 908 via an interface, such as a video adapter 911. A user can interface with computing device 902 via any number of different input devices 903 such as a keyboard, pointing device, joystick, game pad, serial port, and/or the like. These and other input devices are connected to the processors 907 via input/output interfaces 912 that are coupled to the system bus 908, but may be connected by other interface and bus structures, such as a parallel port, game port, and/or a universal serial bus (USB).

Computing device 900 can operate in a networked environment using connections to one or more remote computers through one or more local area networks (LANs), wide area networks (WANs) and the like. The computing device 901 is connected to a network 914 via a network adapter 913 or alternatively by a modem, DSL, ISDN interface or the like.

Those skilled in the art will realize that storage devices utilized to store program instructions can be distributed across a network. For example a remote computer may store a tool such as the adaptive instrumentation runtime monitoring and analysis software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The invention claimed is:

1. A computer readable storage medium, having stored thereon a digital media file comprising:
    a data object that contains data representing digital media content stored in the computer readable storage medium;
    a header object that includes metadata corresponding to the digital media file, the header object further including a table of contents object, the table of contents object containing indexing data readable to provide semantic indexing of the digital media content, wherein the table of contents object comprises an object id which specifies a globally unique identifier for the table of contents object, an object size field which specifies the size of the table of content object and a table of contents field which includes a number of subfields, the subfields include a table of contents header and table of contents data, wherein the table of contents data is formed in a nested structure of entry lists which corresponds to chapters of the digital media content; and
    an index object that includes a set of markers coupled to one or more points of the digital media content stored in the data object.

2. The computer readable storage medium of claim 1, further comprising a header extension object that extends the header object and includes the table of contents object.

3. The computer readable storage medium of claim 1, in which the digital media file is an ASF file.

4. The computer readable storage medium of claim 1, in which the digital media file is an AVI file.

5. The computer readable storage medium of claim 1, in which the table of contents object is uncompressed.

6. The computer readable storage medium of claim 1, in which the data object includes a plurality of data streams.

7. The computer readable storage medium of claim 6, in which the table of contents object includes a table of contents for each of the plurality of data streams.

8. The computer readable storage medium of claim 1, in which the table of contents object includes a table of contents.

9. The computer readable storage medium of claim 1, in which the table of contents object includes a textual based description of the digital media.

10. The computer readable storage medium of claim 1, in which the table of contents object includes a thumbnail picture derived from the digital media.

11. A computer readable medium, having stored thereon a digital media file comprising:
   a data object that contains data representing digital media content stored in the computer readable medium;
   a header object that includes metadata corresponding to the digital media file;
   a table of contents object that contains indexing data readable to provide semantic indexing of the digital media content, such that an index object further includes an object ID field which specifies a predefined globally unique identifier for the table of contents object; and
   an index object that includes a set of markers coupled to one or more points of the digital media content stored in the data object.

12. The computer readable medium of claim 11, in which the predefined globally unique identifier for table of contents object is an ASF_TOC_Type_Playlist identifier or a ASF_TOC Type Editlist identifier or a ASF TOC User Bookmarks identifier or a ASF TOC Type DSP Metadata identifier.

13. The computer readable medium of claim 11, in which the digital media file is an ASF file.

14. The computer readable medium of claim 11, in which the digital media file is an AVI file.

15. The computer readable medium of claim 11, in which the table of contents object is uncompressed.

16. The computer readable medium of claim 11, in which the data object includes a plurality of data streams.

17. The computer readable medium of claim 16, in which the table of contents object includes a table of contents for each of the plurality of data streams.

18. The computer readable medium of claim 11, in which the table of contents object includes a table of contents.

19. The computer readable medium of claim 11, in which the table of contents object includes a textual based description of the digital media.

20. The computer readable medium of claim 11, in which the table of contents object includes a thumbnail picture derived from the digital media.

* * * * *